United States Patent [19]
Honeycutt

[11] Patent Number: 5,880,535
[45] Date of Patent: Mar. 9, 1999

[54] TAP RESISTANT SECURITY CIRCUIT

[76] Inventor: Larry W. Honeycutt, P.O. Box 86, Concord, N.C. 28026

[21] Appl. No.: 949,767

[22] Filed: Oct. 14, 1997

[51] Int. Cl.$^6$ ................................................. G08B 21/00
[52] U.S. Cl. ..................... 307/10.2; 307/10.1; 200/81 R; 200/61.08; 200/300; 180/287; 123/198 DC
[58] Field of Search ............................. 200/61.41, 61.42, 200/61.43, 61.44, 81 R, 61.08, 300; 307/9.1, 10.1, 10.2, 10.3, 10.4, 10.5, 10.6, 116, 117, 118, 119; 73/704, 717, 723; 340/425.5, 426, 603, 605, 626; 180/287; 123/198 DC

[56] References Cited

U.S. PATENT DOCUMENTS

| | | | |
|---|---|---|---|
| 1,855,321 | 4/1932 | Shackelton . | |
| 1,904,226 | 4/1933 | Henneberger . | |
| 1,904,227 | 4/1933 | Henneberger . | |
| 2,089,179 | 8/1937 | Black | 178/44 |
| 2,219,262 | 10/1940 | Mample et al. | 177/311 |
| 3,217,309 | 11/1965 | Parker | 340/242 |
| 3,259,892 | 7/1966 | Wickelmann | 340/242 |
| 3,268,867 | 8/1966 | Pickett et al. | 340/152 |
| 3,271,752 | 9/1966 | Lansch | 340/214 |
| 3,444,336 | 5/1969 | Holt et al. | 137/71 |
| 3,512,556 | 5/1970 | McKhann | 137/71 |
| 3,757,292 | 9/1973 | Sato et al. | 200/81.4 |
| 4,122,436 | 10/1978 | Gmeiner et al. | 340/605 |
| 4,322,590 | 3/1982 | Sobel | 200/81.9 R |
| 4,439,894 | 4/1984 | Schwiers et al. | 19/0.2 |
| 4,908,483 | 3/1990 | Miller | 200/61.43 |
| 5,168,240 | 12/1992 | Howe | 340/603 |
| 5,225,643 | 7/1993 | Marchant | 73/717 |
| 5,359,927 | 11/1994 | Demeyer | 101/35 |
| 5,362,100 | 11/1994 | Werbelow et al. | 280/736 |
| 5,398,965 | 3/1995 | Giurlando et al. | 280/735 |
| 5,410,916 | 5/1995 | Cook | 73/706 |

*Primary Examiner*—Jeffrey Gaffin
*Assistant Examiner*—Peter Ganjian
*Attorney, Agent, or Firm*—Rhodes Coats & Bennett, L.L.P.

[57] ABSTRACT

A tap-resistant security circuit. In the preferred embodiment, the apparatus includes a conduit including an electrically conductive wire surrounded by a gas-filled, gas impermeable sheath. At one end of the conduit is a pressure switch which is normally open but is maintained closed by the pressure in the gas-filled conduit. The other end of the conduit is sealed. If the gas-filled conduit is disturbed, for example, if an attempt is made to cut the wire, the gas within the conduit escapes, the pressure holding the switch closed drops and the circuit is opened. As a result, any attempt to by-pass or "tap" the wire results in the current through the wire being interrupted.

34 Claims, 1 Drawing Sheet

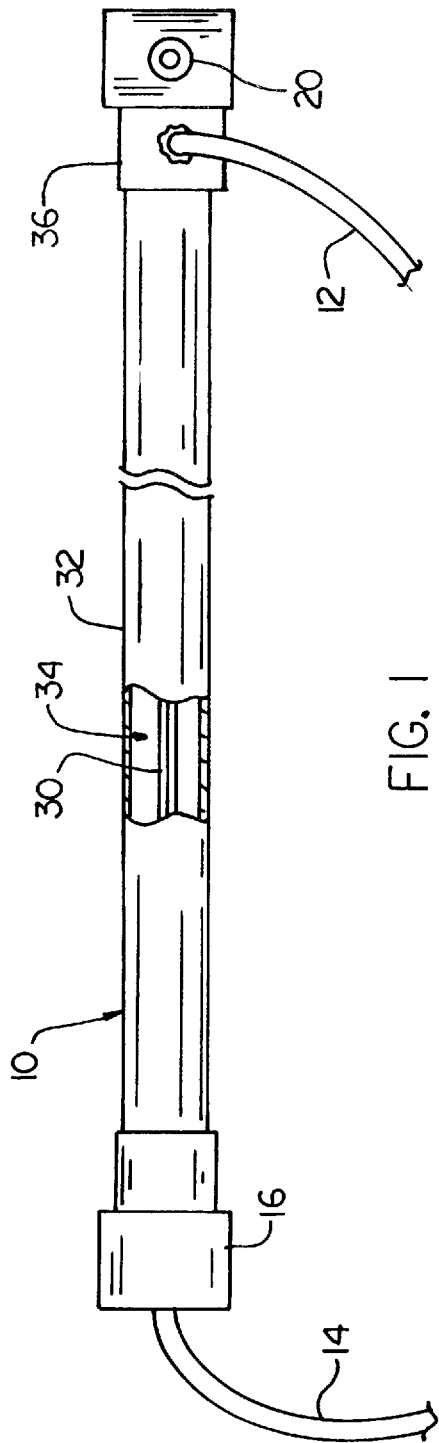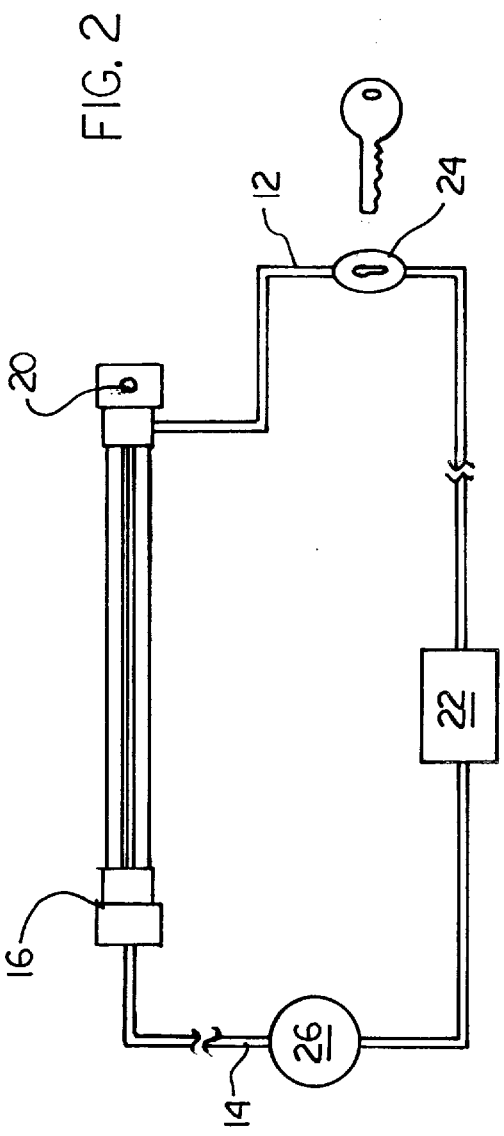

TAP RESISTANT SECURITY CIRCUIT

BACKGROUND OF THE INVENTION

(1) Field of the Invention

The present invention relates generally to tap-resistant wiring and, more particularly, to a tap-resistant conduit especially adaptable for automotive anti-theft security systems. Such wiring may also be used to enhance security of communications networks.

(2) Description of the Prior Art

Security is becoming increasingly important whether it is to prevent a car theft or the interception of confidential information from a "secure" telephone or data line.

Automobile security systems have continued to improve over the years but, in most cases, once the thief is in the car he will be able to start it by bypassing the ignition switch and "hot wiring" the car. More sophisticated systems using "smart" keys are more difficult to bypass but also may not allow the real owner to operate the car by due to a false negative if the system fails to identify the key properly.

With regard to communications, encryption technology also has improved but can possibly be broken and, sometimes, may result in problems between the parties trying to communicate. In addition, the cost may be prohibitive when many lines are required.

U.S. Pat. No. 4,122,436, issued to Gmeiner et al., discloses an installation for the protection of a line, such as a telephone line. The line is surrounded at least within its area potentially endangered by external influences by a coaxially arranged tubular member with the annular space disposed between the line and the tubular member filled with a control media which will trigger a warning indication in case of an unusual pressure change caused, for example, by mechanical damage to the outer tubular member. In the preferred embodiment, this invention is directed towards detecting damage to a vacuum-operated headlight adjustment system and alerting the driver.

Therefore, while Gmeiner et al. discloses a gas-filled conduit surrounding a wire to detect a failure, there is no suggestion of using the pressure of the gas to maintain the connection of the wire in its normal operating state and, when there is a break in the conduit, disengaging the wire contact to disable the circuit.

Thus, there remains a need for a new and improved tap-resistant conduit which does not normally require special circuity or encryption while, at the same time, is simple to install and will reliably prevent the operation of the circuit if an attempt to tap or hot wire the circuit is made.

SUMMARY OF THE INVENTION

The present invention is directed to a tap-resistant security circuit. In the preferred embodiment, the apparatus includes a conduit including an electrically conductive wire surrounded by a gas-filled, gas impermeable sheath. At one end of the conduit is a pressure switch which is normally open but is maintained closed by the pressure in the gas-filled conduit. The other end of the conduit is sealed. If the gas-filled conduit is disturbed, for example, if an attempt is made to cut the wire, the gas within the conduit escapes, the pressure holding the switch closed drops and the circuit is opened. As a result, any attempt to by-pass or "tap" the wire results in the current through the wire being interrupted.

Accordingly, one aspect of the present invention is to provide a tap resistant security circuit. The circuit includes a source of an input signal, a receiver for receiving the input signal and providing an output signal, and a tap-resistant conduit connected between the receiver and source. The tap resistant conduit includes a conductive element, and a pressure sensitive switch selectively operable between an open position and a closed position. A gas impermeable sheath surrounds the conductive element and the pressure sensitive switch and is sealed to the conductive element at each of the ends. The interior of the sheath is maintained at a different pressure the the exterior of the sheath such that an intrusion through the sheath results in a change of pressure and changes the pressure sensitive switch from the closed position to the open position thereby preventing the receiver from receiving an input signal and providing an output signal.

Another aspect of the present invention is a tap resistant conduit having a circuit in which a portion if the circuit is formed of a conductive wire. The tap resistant conduit includes a gas impermeable sheath surrounding the conductive wire and sealed to the wire at each end to hold a compressible media within the sheath. The conduit also includes a pressure sensitive switch connected to the wire and the sheath that selectively changes between an open position and a closed position such that the compressible media maintains the pressure sensitive switch in a closed position to form a closed circuit. An intrusion of the sheath causes the compressible media to escape and the pressure sensitive switch to change to an open position to disable the circuit.

Still another aspect of the present invention is to provide a tap resistant security circuit having a circuit that includes a source of an input signal and a receiver for receiving the input signal and sending out an output signal, and a tap resistant conduit connected between the source and receiver. The tap resistant conduit includes a conductive wire which forms a portion of the circuit between the source and the receiver, a sheath surrounding the conductive wire and sealed on each end to hold a compressible media. Inside the sheath is a pressure sensitive switch which is selectively changeable between an open position and a closed position. The pressure sensitive switch is maintained in a closed position by the compressible media to maintain a closed circuit. A valve is attached to the sheath to permit a sufficient amount of gas to be added to the sheath to maintain the pressure of the compressible media and the pressure sensitive switch in the closed position to allow for normal operation of the circuit. When the sheath is intruded, the compressible media is discharged resulting in the pressure sensitive switch changing to an open position and disabling the security circuit.

These and other aspects of the present invention will become apparent to those skilled in the art after a reading of the following description of the preferred embodiment when considered with the drawings.

BRIEF DESCRIPTION OF THE DRAWINGS

FIG. 1 is a schematic diagram illustrating a tap-resistant conduit constructed according to the present invention; and FIG. 2 is a schematic diagram of the present invention as used in an automobile anti-theft system.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a tap-resistant conduit, generally designated 10, is shown constructed according to the present invention.

The tap-resistant conduit 10, shown in FIG. 1, includes a central conductive wire 30 surrounded by a gas impermeable outer sheath 32. A compressible media 34, for example air, is disposed between the wire 30 and the outer sheath 32. At one end of the conduit 10, the wire 30 is attached to a normally-open pressure sensitive switch 16. The other end of the switch 16 is attached to an output wire 14, which connects the switch 16 to the rest of the circuit.

At the other end of the tap-resistant conduit 10, wire 30 is conductively connected to the interior of metallic sleeve 36. Input wire 12 is conductively connected to the outside of metallic sleeve 36, thereby permitting input current to travel through metallic sleeve 36 and into wire 30.

Charging valve 20 is also attached to metallic sleeve 36. The charging valve 20 is normally closed, but may be opened using a pneumatic pump that screws into the threads of the charging valve 20. The charging valve 20 is used to increase the pressure of the compressible media 34 inside the conduit 10 in order to close the normally-open pressure sensitive switch 16.

FIG. 2 illustrates an automotive application of the present invention. In normal operation, the handoperated ignition switch 24 closes the circuit between the battery 22 and the starter motor 26. By installing the tap-resistant conduit 10 between the ignition switch 24 and the starter motor 26, a potential thief is unable to "hot wire" the vehicle by bypassing the ignition switch 24 since any disturbance of the integrity of the gas impermeable outer sheath will produce a loss of pressure which will disable the circuit completely thereby preventing the thief from starting the car.

Certain modifications and improvements will occur to those skilled in the art upon a reading of the foregoing description. By way of example, while the preferred embodiment show a single conductive wire, a bundle of wires, such as a telephone trunk, could also be protected. Also, another pressure switch could be added at the other end of the line to further disable the line, for example in two-way communication applications. Finally, while the present invention has been shown using a conductive wire, the system could be adapted to disable transmission through a fiber optic bundle also. It should be understood that all such modifications and improvements have been deleted herein for the sake of conciseness and readability but are properly within the scope of the following claims.

I claim:

1. A tap-resistant security circuit, said apparatus comprising:
    (a) a source of an input signal;
    (b) a receiver for receiving said input signal and for providing an output signal; and
    (c) a tap-resistant conduit connected between said source and said receiver, said tap-resist t conduit including: (i) a conducive element attached to one of said source and said receiver; (ii) a gas impermeable sheath surrounding said conductive element and sealed to said conductive element at each end of said conductive element, the interior of said sheath being at a different pressure than the exterior of said sheath; and (iii) a pressure sensitive switch selectively operable between an open position and a closed position, said pressure sensitive switch connected between one of said source and said receiver, whereby an intrusion through said sheath results in a change of pressure inside said sheath and said pressure sensitive switch switches from said closed position to said open position, whereby preventing said receiver from receiving said input signal and providing said output signal.

2. The apparatus according to claim 1, further including a valve attached to said sheath for permitting a pressure difference of a sufficient amount to be added to said sheath to maintain said pressure sensitive switch in said closed position for normal operation of said security circuit.

3. The apparatus according to claim 2, wherein said valve is attached to said sheath adjacent to said source of said input signal.

4. The apparatus according to claim 2, wherein said valve is a normally closed check valve.

5. The apparatus according to claim 2, wherein said valve is a needle valve.

6. The apparatus according to claim 1, wherein said source of said input signal is an electrical supply.

7. The apparatus according to claim 6, wherein said source of said input signal includes a manually operated switch.

8. The apparatus according to claim 7, wherein said manually operated switch is an ignition switch.

9. The apparatus according to claim 1, wherein said receiver for receiving said input signal and for providing said output signal includes a relay switch.

10. The apparatus according to claim 9, wherein said relay switch is a starter solenoid.

11. The apparatus according to claim 10, wherein said starter solenoid is connected to a starter motor of an automobile.

12. A tap-resistant conduit, said apparatus comprising:
    (a) a conductive wire forming a section of a circuit;
    (b) a gas impermeable sheath surrounding said wire and sealed to said wire at each end of said wire;
    (c) a compressible media located between said wore and said sheath; and
    (d) a pressure sensitive switch selectively operable between an open position and a closed position, said pressure sensitive switch connected to one end of said wire and said sheath, whereby an intrusion through said sheath allows said compressible media to escape and said pressure sensitive to switch from said closed position to said open position, thereby disabling said circuit.

13. The apparatus according to claim 12, wherein said conductive wire includes an insulating jacket.

14. The apparatus according to claim 12, wherein said conductive wire is electrically conductive.

15. The apparatus according to claim 12, wherein said conductive wire is a fiber optic cable.

16. The apparatus according to claim 12, wherein said compressible media located between said wire and said sheath is a gas.

17. The apparatus according to claim 16, wherein said gas is air.

18. The apparatus according to claim 16, wherein said gas is an inert gas.

19. A tap-resistant security circuit, said apparatus comprising:
    (a) a source of an input signal;

(b) a receiver for receiving said input signal and for providing an output signal; and (c) a tap-resistant conduit connected between said source and said receiver, said tap-resistant conduit including: (i) a conductive wire forming a section of a circuit; (ii) a gas impermeable sheath surrounding said wire and sealed to said wire at each end of said wire; (iii) a compressible media located between said wire and said sheath; and (iv) a normally open pressure sensitive switch connected to one end of said wire and said sheath, whereby an intrusion through said sheath allows said compressible media to escape and said normally open pressure sensitive switch to open, thereby disabling said circuit; and (d) a valve attached to said sheath for permitting a sufficient amount of said compressible media to be added to said sheath to close said normally open pressure sensitive switch for normal operation of said security circuit.

20. The apparatus according to claim 19, wherein said valve is attached to said sheath adjacent to said source of said input signal.

21. The apparatus according to claim 19, wherein said valve is a normally closed check valve.

22. The apparatus according to claim 19, wherein said valve is a needle valve.

23. The apparatus according to claim 19, wherein said source of said input signal is an electrical supply.

24. The apparatus according to claim 23, wherein said source of said input signal includes a manually operated switch.

25. The apparatus according to claim 24, wherein said manually operated switch is an ignition switch.

26. The apparatus according to claim 19, wherein said receiver for receiving said input signal and for providing said output signal includes a relay switch.

27. The apparatus according to claim 26, wherein said relay switch is a starter solenoid.

28. The apparatus according to claim 27, wherein said starter solenoid is connected to a starter motor of an automobile.

29. The apparatus according to claim 19, wherein said conductive wire includes an insulating jacket.

30. The apparatus according to claim 19, wherein said conductive wire is electrically conductive.

31. The apparatus according to claim 19, wherein said conductive wire is a fiber optic cable.

32. The apparatus according to claim 19, wherein said compressible media located between said wire and said sheath is a gas.

33. The apparatus according to claim 32, wherein said gas is air.

34. The apparatus according to claim 32, wherein said gas is an inert gas.

* * * * *

UNITED STATES PATENT AND TRADEMARK OFFICE
CERTIFICATE OF CORRECTION

PATENT NO. : 5,880,535
DATED      : March 9, 1999
INVENTOR(S) : Larry W. Honeycutt It is certified that error appears in the above—identified patent and that said Letters Patent is hereby corrected as shown below:

Column 3, line 62,
In Claim 1 (c), line 2, "tap-resist t" should be "tap-resistant".

Column 3, line 63,
Claim 1 (c), line 3, "conducive" should be "conductive".

Column 4, line 5,
Claim 1 (c), line 15, "whereby" should be "thereby".

Signed and Sealed this

Seventeenth Day of August, 1999

Q. TODD DICKINSON

Attest:

Attesting Officer

Acting Commissioner of Patents and Trademarks